United States Patent
Bastawros et al.

(10) Patent No.: US 8,683,803 B2
(45) Date of Patent: Apr. 1, 2014

(54) METHOD AND APPARATUS FOR ENERGY HARVESTING THROUGH PHASE-CHANGE INDUCED PRESSURE RISE UNDER COOLING CONDITIONS

(76) Inventors: Ashraf F. Bastawros, Ames, IA (US);
Abhijit Chandra, Ames, IA (US); Tom I-Ping Shih, Ames, IA (US)

(*) Notice: Subject to any disclaimer, the term of this patent is extended or adjusted under 35 U.S.C. 154(b) by 1258 days.

(21) Appl. No.: 12/019,349

(22) Filed: Jan. 24, 2008

(65) Prior Publication Data

US 2008/0245068 A1 Oct. 9, 2008

Related U.S. Application Data

(60) Provisional application No. 60/886,412, filed on Jan. 24, 2007.

(51) Int. Cl.
*F01K 25/06* (2006.01)
*F01K 25/08* (2006.01)

(52) U.S. Cl.
USPC .................. 60/649; 60/651; 60/671; 60/673

(58) Field of Classification Search
USPC ........... 60/508–515, 645, 670, 671, 649, 651, 60/673
See application file for complete search history.

(56) References Cited

U.S. PATENT DOCUMENTS

| | | | |
|---|---|---|---|
| 4,075,845 A | * | 2/1978 | Allen .............................. 60/527 |
| 4,186,558 A | * | 2/1980 | Kuo ................................ 60/527 |
| 4,220,006 A | * | 9/1980 | Kindt .............................. 60/527 |
| 4,513,053 A | | 4/1985 | Chen et al. |
| 4,637,888 A | | 1/1987 | Lane et al. |
| 5,375,983 A | * | 12/1994 | Engels .......................... 417/379 |
| 6,332,318 B1 | * | 12/2001 | Thorn ............................ 60/512 |
| 7,262,360 B1 | | 8/2007 | Davis |
| 7,340,899 B1 | | 3/2008 | Rubak et al. |
| 7,356,993 B2 | | 4/2008 | Smith |

* cited by examiner

*Primary Examiner* — Hoang Nguyen
(74) *Attorney, Agent, or Firm* — McKee, Voorhees & Sease, P.L.C.

(57) ABSTRACT

A method and apparatus for generating power which includes a phase-change media (PCM) that expands upon cooling contained within an expandable capsule if the phase change involves solidification (if phase change is solid-solid, then capsules are not needed), a carrier liquid that does not freeze in the operating temperature range, a heat exchanger, and an engine. Alternatively, the method and apparatus can include a PCM contained within a layer next to the walls of a constant volume container, a working liquid within the container that does not freeze in the operating temperature range, a heat exchanger, and an engine. In both cases, the engine denotes a device that converts the energy in the high-pressure liquid into electrical or mechanical power.

4 Claims, 5 Drawing Sheets

METHOD AND APPARATUS FOR ENERGY HARVESTING THROUGH PHASE-CHANGE INDUCED PRESSURE RISE UNDER COOLING CONDITIONS

CROSS REFERENCE TO RELATED APPLICATIONS

This application claims priority to and incorporates in its entirety the disclosure and drawings of U.S. provisional patent application Ser. No. 60/886,412 entitled METHOD AND APPARATUS FOR ENERGY HARVESTING THROUGH PHASE-CHANGE INDUCED PRESSURE RISE UNDER COOLING CONDITIONS.

FIELD OF THE INVENTION

The present invention relates generally to the field of harvesting energy and power generation. More specifically, though not exclusively, the present invention relates to a new technique to harvest energy by having a phase-change media (PCM) that increases volume upon cooling such as water, cooling the PCM to induce phase change from liquid to solid or a solid-solid phase transformation, controlling the change in volume created by the phase change to produce change in pressure, and utilizing the high pressure generated to produce work. When the PCM is heated back to where its volume is a minimum, the cycle can be repeated again. Since freezing/melting and solid-solid phase transformations can occur at moderate temperatures, low-grade energy sources—that are now ignored or discarded—can be utilized. For example, cooling can be from the environment, and heating can be from solar, geothermal, or the exhaust gas from car engines and other power plants. Thus, this invention can be used to augment existing power-generation techniques and potentially as a substitute for other power-generation techniques. Applications of this invention include among others: electrical and mechanical power generation for land, water, air, and space systems; portable electrical and mechanical power systems; mechanical power to provide for propulsion; mechanical power to drive micro and nano electro-mechanical systems; and mechanical power to drive hydraulic systems.

BACKGROUND OF THE INVENTION

Problems In The Art

A wide variety of methods have been developed to generate power. These power-generation methods can be broadly classified based on whether the energy source is renewable or non-renewable. Most of the power used by the world today is generated by using non-renewable energy sources. Typically, a fossil fuel such as coal or gasoline is combusted or a controlled nuclear reaction is initiated to generate the necessary heat to raise the temperature and pressure of a working media to run an electric generator or to produce mechanical work.

For these power-generation techniques, the challenge is not only how to improve the efficiency of the energy conversion process but also how to produce reliable and long service-life structures that can contain the high-temperature/high-pressure working media as well as resist the highly corrosive environments. In addition, the burning of all fossil fuels produces $CO_2$ gas, which is a major contributor to climate change. Also, $NO_x$ as well as other harmful chemicals are produced and emitted, which harm the environment. For nuclear power plants, the critical issues are safe operation in populated areas and the transport and storage of hazardous nuclear wastes with toxicity that can last decades if not centuries.

Recently, bio-based fuels such as ethanol and bio-diesel have been proposed. However, there are concerns on efficiency and land use associated with the production of such bio-based fuels. Moreover, these fuels have to be transported to stationary power plants or to filling stations—requiring a network of transportation systems, which impose additional risks and costs on operation. It is, therefore, desirable to provide a technique for power generation that minimizes the potential risk to the environment and the operators.

Currently, power-generation techniques that are based on renewable-energy sources include hydroelectric, wind energy, and solar energy. These power-generation techniques have the advantage of zero pollution to our environment though the cost of constructing these power-generation plants can be quite high. Moreover, such power-generation techniques may not be operational when the water flow rate, wind speed, or sun light needed are insufficient. Some, such as solar and wind power, also suffer from low energy density (energy per unit foot print of utilized land). Others, such as thermoelectric power generation, suffer from a very low energy conversion rate (less than few percent at best).

Thus, there is an urgent need to seek new renewable-energy sources that can meet the world's growing demands and to develop safe and environmentally friendly techniques to convert that energy to useful forms. Of simultaneous interest are the issues of efficiency of the conversion cycle, energy density or power output per unit weight of the device or "engine", and its associated footprint.

There is thus a need to provide a method of power generation that addresses these and other problems in the art.

BRIEF SUMMARY OF THE INVENTION

Features of the Invention

A general feature of the present invention is the provision of a method and apparatus for harvesting energy and generating power which addresses the problems found in the prior art.

A further feature of the present invention is to harvest energy by cooling a material that expands upon solidification and/or a solid-solid phase change.

Another feature of the present invention is enabling the utilization of low-grade energy sources such as solar and geothermal to generate substantially more power than is possible with existing methods.

A further feature of the present invention is the provision of a method and apparatus for generating power which minimizes the environmental impact of power generation.

These, as well as other features and advantages of the present invention, will become apparent from the following specification and claims.

DETAILED DESCRIPTION OF THE PREFERRED EMBODIMENT

Figure 1:
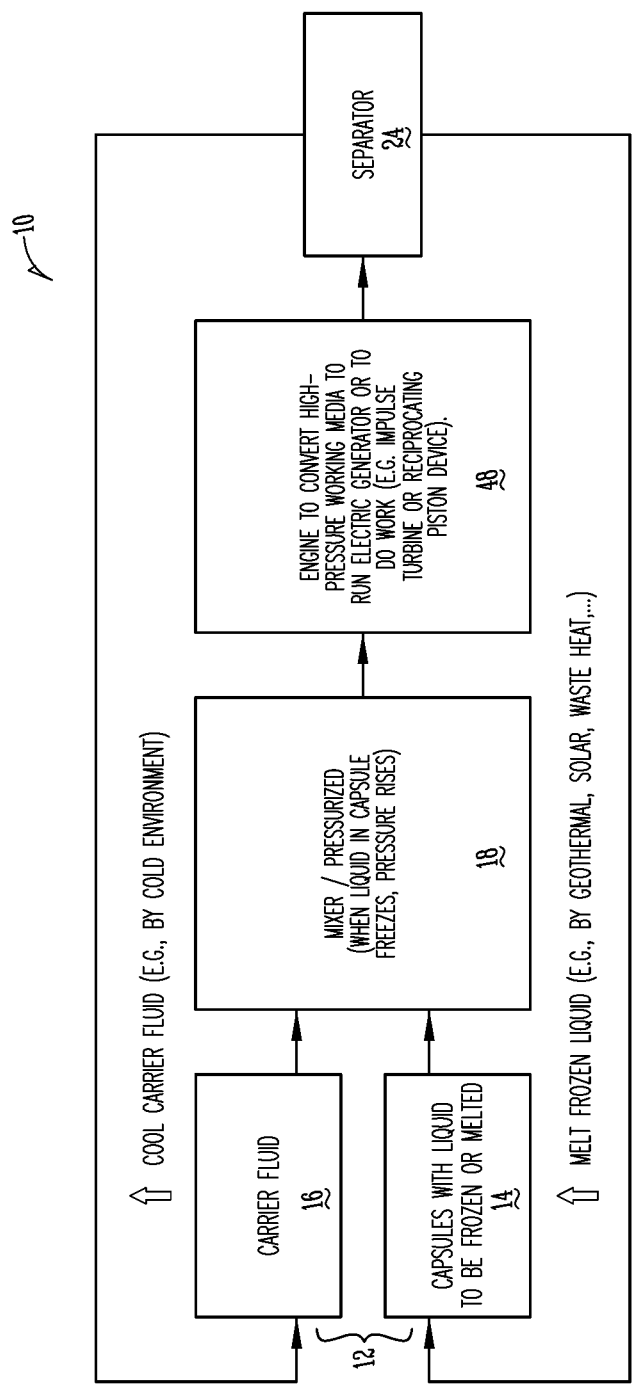
FIG. 1 is a general representation of a generic open cycle system.

The present invention generally comprises a method and apparatus for generating power which includes a phase-change media (PCM) that expands upon cooling contained within an expandable capsule if the phase change involves solidification (if phase change is solid-solid, then capsules are not needed), a carrier liquid that does not freeze in the operating temperature range, a heat exchanger, and an engine. Alternatively, the method and apparatus can include a PCM contained within a layer next to the walls of a constant volume container, a working liquid within the container that does not freeze in the operating temperature range, a heat exchanger, and an engine. In both cases, the engine denotes a device that converts the energy in the high-pressure liquid into electrical or mechanical power. Unlike existing methods of energy harvesting and power generation, the disclosed invention generates increased pressure that can be used to produce power by cooling a medium across a critical phase-change temperature instead of heating it.

The present invention generates high pressure while heat is being rejected from the system. In other words, the present invention cools its "working media" (which is also 100% recycled), while others heat their working media by using a non-renewable energy source. As noted, the present invention does require heat input to melt the frozen PCM or to reverse the solid-solid phase change to repeat the cycle. However, since the temperature needed to melt the PCM or create the solid-solid phase change can be moderate (e.g., it is around 0° C. for water at atmospheric pressure), the proposed invention can utilize low-grade heating sources such as solar, geothermal, exhaust of a car engine or a power plant as well as combustion of low-grade fuels at moderate temperatures and pressures.

The present invention belongs to the class of environmentally friendly energy sources such as hydroelectric, solar, wind, and thermoelectric, but is more efficient. Furthermore, it delivers significantly better energy density and a smaller foot-print. It only depends on a small temperature change about the freezing/solid-solid phase-transformation point. Thus, it is far more stable and predictable when compared to wind energy and solar energy. Also, it can be applied to land, water, air, and space systems as well as portable personal systems.

For example, consider water as the phase-change medium (PCM). The anomalous behavior of water is that it expands about 9% upon freezing, which is a well known phenomenon due to water molecule's dipole rearrangements. However, this expansion upon freezing has been considered detrimental because freezing of water has caused water pipes and pavements to crack, which results in damage to houses and civil infrastructures. The present invention utilizes this characteristic expansion of water upon freezing to produce useful mechanical work. Similarly, any material (i.e., need not be water) that expands upon cooling due to phase transformation may be utilized in the present invention. Thus, one could manufacture a material that expands upon freezing in a temperature range of interest.

Continuing this illustration using water as the PCM and recognizing that it also applies to other liquids or solids that expand upon cooling, freezing of water can produce large increase in pressure if the volume is not allowed to change appreciably. However, the freezing process must occur fast enough so that super cooled liquid will become a solid. Thus, three issues need to be addressed in a power-generation device that harvest energy through the freezing of water, and these are as follows: (1) How to freeze quickly the phase-change medium (PCM) in large quantity? (2) How to harvest the energy when the PCM freezes? (3) How to generate power from the energy harvested?

Freeze Quickly

To address the first issue on how to freeze the PCM quickly, consider a PCM at temperature $T_A$ contained in a small expandable capsule surrounded by a carrier liquid at temperature $T_B$, where $T_A$ is higher than the freezing temperature of the PCM but $T_B$ is lower than the freezing temperature of the PCM but higher than the freezing temperature of the carrier liquid. How fast the PCM in its capsule will freeze depends on the following three factors:(a) the ratio of the surface area of the capsule exposed to the cooler carrier liquid to the volume of the PCM to be frozen (the larger the better, which occurs if at least one of the dimensions of the capsule is small), (b) the temperature difference between $T_A$ and $T_B$ (the larger the better, but is limited by the high and low temperature sources), and (c) the heat transfer rate between the PCM and the carrier liquid (the higher the better, which occurs if there is high relative motion for forced convection between the PCM and the carrier liquid).

Based on the above, the present invention achieves high heat-transfer rate to freeze quickly via two approaches. In one approach, the melted PCM—segregated and contained in numerous "small" expandable capsules—is mixed with a carrier liquid that does not freeze in the operating temperature range. This carrier liquid will cause the PCM in the capsules to freeze by being colder or to melt by being hotter through forced convection. If the PCM is water, then the carrier liquid could be a saline solution or water with enough salt added to prevent freezing in the temperature and pressure regime of interest.

The material used to make the capsule must have high corrosion resistivity to both the PCM and the carrier liquid and have high thermal conductivity. Also, it must exhibit high fatigue life. Examples of this material include metallic thin foils such as copper- and nickel-based alloys and polymers with high thermal-conductivity fillers such as carbon.

The shape of the capsules must allow expansion and contraction repeatedly with minimal deformation energy and capsule-skin stresses. Also, the shape must enable flow of the working media—capsules and carrier liquid—to flow through the engine as well as have minimal form drag and highest surface heat transfer. The best shapes could be disk-like platelettes, slender ellipsoids, thin long rods, and other shapes that meet the specified constraints.

In the second approach, the PCM is confined within a very thin layer (millimeter to micrometers) next to the walls of an essentially constant-volume container. The other liquid "similar to the carrier liquid in the first approach" which will not freeze in the operating temperature range fills the remainder of the container. By heating or cooling the walls of the container, the PCM in the thin layer will freeze or melt quickly if the layer where the PCM is contained is thin. In this second approach, the working liquid consists only of the liquid that does not freeze.

The PCM in the thin layer next to the wall must be compartmentalized by an expandable membrane with a net-like structure to ensure that no bulges form when the PCM is in liquid form. This layer must be thin for the freezing and melting to occur quickly, but the volume of the thin layer can be increased by using extended surfaces (e.g., fins) from the walls. The membrane material must have high corrosion resistivity to both the PCM and the working liquid and have high thermal conductivity. Also, it must exhibit high fatigue life. Examples of this material include metallic thin foils such as copper- and nickel-based alloys and polymers with high thermal conductivity fillers such as carbon.

The membrane shape must allow expansion and contraction repeatedly with minimal deformation energy, skin stresses, and reaction forces at the anchoring or netting points, where membrane is attached to the compartment built into the wall.

For both approaches, the role of the liquid that does not freeze in the rigid container is critical for two reasons. The first is that though the container may be essentially rigid so that the overall volume does not change as the pressure rises with freezing, locally the liquid that does not freeze will be compressed slightly so that the freezing PCM will expand somewhat. Thus, the freezing of the PCM is not a constant volume process. The second is that it is the working/carrier liquid that is harvesting the energy as the pressure in the container rises when the PCM freezes.

Harvest Energy as PCM Freezes

To address the second issue of harvesting the energy, the present invention has the pressure rise due to freezing occur in a nearly rigid container. As the PCM—inside small capsules dispersed throughout a carrier fluid or in thin layers next to the container—freezes and its volume wants to increase, the pressure inside the entire container will increase only if the volume change of the rigid container is less than the overall volume increase enabled by freezing the PCM in capsules or thin layers. Though the rest of the solution does not freeze, they will acquire the high pressure generated by freezing the PCM in the capsules or in the thin layers. If steel is used to construct a geometrically stiffened rigid container (note that steel is about 100 times more incompressible than water and so behave essentially as rigid as far as water and ice are concerned), just preventing 1% increase in volume by the freezing water can increase pressure by a factor of about 200.

It is during this pressure rise—created by freezing and not letting it expand—that energy is harvested. Note that this harvest of energy takes place when thermal energy is rejected instead of added. This is where it differs from all existing power-generation methods. However, in order to freeze, it must be in liquid form first. Thus, thermal energy is added to the system when the frozen PCM is melted so that the cycle can be repeated.

The freezing could be accomplished by the cold environment, where the ambient temperature is below the freezing point of the PCM to be frozen. Examples of such environments for freezing a PCM such as water include the North Pole, the South Pole, and winters in North America, Europe, and Asia as well as cold air at around 35,000 feet above the ground where commercial aircraft fly. In space, the part of the satellite or spacecraft not facing the sun or other hot objects sees cold temperatures that can freeze the PCM, whereas the side that faces the sun can melt the PCM. Alternatively, a refrigeration system could be couple to this system to create the low temperature needed to freeze, but the power needed for the refrigeration must be less than the total power output by the overall system.

The melting can be accomplished by a variety of ways. One way is via geothermal energy, which is abundant since the earth's core is hot and the capacity is huge. Others include the ocean, the sea, and the river waters; the waste heat used for heating homes; the waste heat from existing power plants that burn coal, natural gas, or other petroleum-based fuels; heaters run by solar or wind energy. If waste heat from the exhaust of engines or chimneys of power plants is used, then the current invention can increase the efficiency of existing power-generation methods. If geothermal, wind, or solar energy is used, then this invention could be a substitute for existing power-generation methods.

Note that since melting of ice and freezing of water can occur over small temperature ranges even at high pressures, the proposed invention operates at very moderate temperatures. Thus, low-grade energy sources that are typically ignored or discarded can now be utilized effectively to produce substantial power. Also, durability and service life should be long since the operating environment is not harsh (e.g., no hot corrosion such as those associated with gas turbines). Finally, this power-generation method generates no pollutants, no green gases, and orders of magnitude lower thermal pollution than any existing power-generation method.

Generate Power

To address the third issue of generating power from the highly pressurized working media, the following two design concepts are proposed: (1) open cycles that can be continuous or intermittent where the high-pressure working media rotates a turbine and (2) closed cycles where the high-pressure working media oscillates a reciprocating piston with momentum attenuation in capillary tubes for controlling the desired torque-speed characteristics. Other forms of electrical or magnetic power generation can be achieved by actuating piezo-electric or magneto-strictive stacks instead.

The present invention will be described as it applies to its preferred embodiment. It is not intended that the present invention be limited to the described embodiment. It is intended that the invention cover all modifications and alternatives which may be included within the spirit and scope of the invention. Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized, and that structural, sequential, and temporal changes may be made without departing from the scope of the present invention.

The Devices

Figure 2:
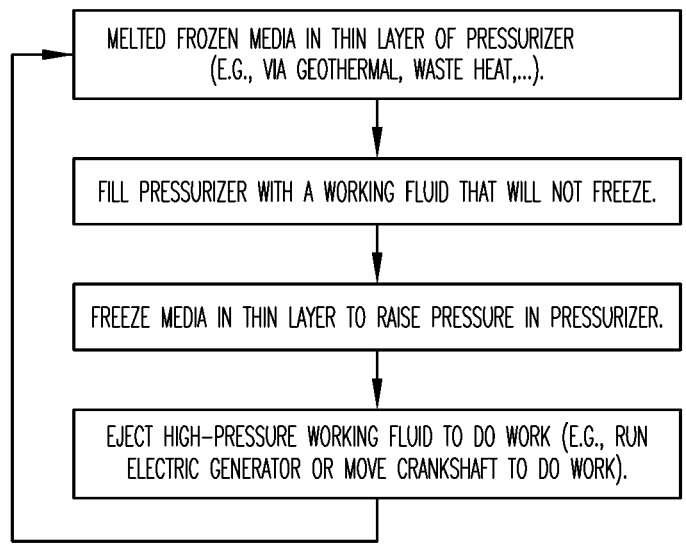
FIG. 2 is a general representation of another embodiment of a generic open cycle system.
Figure 2:
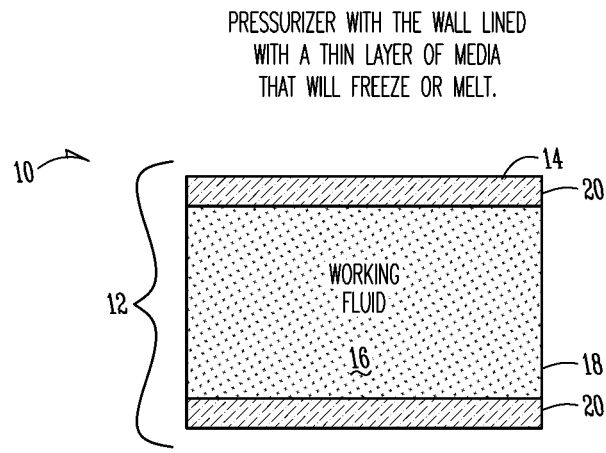

Schematics of two generic open cycles for the invention 10 are shown in FIGS. 1 and 2. In one design (Open Cycle 1, FIG. 1), the working media is made up of PCM 14 (in capsules if PCM is a liquid) and a carrier liquid 16 that will not freeze in the operating temperature range. For this design, the carrier liquid 16 is cooled to below the freezing or phase-change temperature of the PCM so that it could transform (i.e., freeze) all of the PCM 14 when mixed. An important component of this design is the "mixer/pressurizer" 18 where the PCM 14 to be transformed are mixed with the "cold" carrier liquid 12 in a rigid container 18. Basically, once the PCM 14 and the carrier liquid 16 are mixed, the container 18 must be sealed before transformation starts to capture the pressure rise. To maximize pressure rise, the container 18 should be sealed when the volume of the PCM/carrier-liquid 12 is minimum.

In the other design (Open Cycle 2, FIG. 2), the PCM 14 to be transformed are confined in a thin layer 20 next to the walls of the rigid containers 18 by an expandable membrane 22 with a net-like structure to ensure that no bulges form when the PCM 14 is in liquid form (i.e., the thin layer 20 must be compartmentalized so that heat transfer can be fast and pressure rise can be maximized). This layer must be thin for the phase change to occur quickly, but the volume of the thin layer 20 can be increased by using extended surfaces (e.g., fins) from the walls. With this design, the PCM 14 that will transform is always separated from the working liquid so that a "separator" 24 in the Open Cycle 1 design is not needed (see FIGS. 1 and 4). Also, the transformation process can start after the container 18 is filled with the working liquid 12 and closed.

Figure 3:
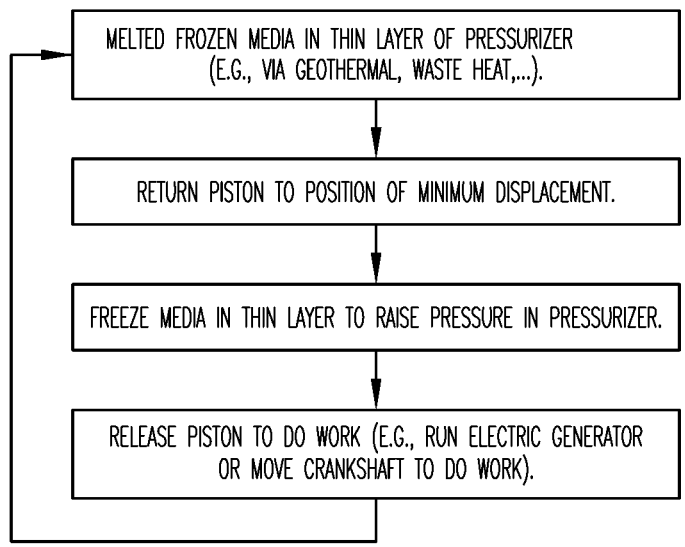
FIG. 3 is a general representation of a generic close cycle system.
Figure 3:
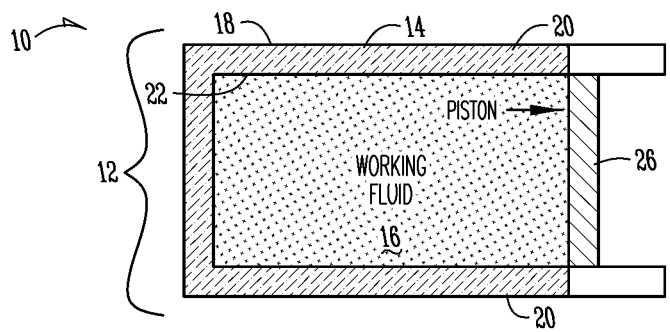

A schematic of a generic closed system is shown in FIG. 3. In this configuration, the working media 12 never leaves the container 18. Once the pressure generated exceeds some critical value, that pressure will move the piston 26 to do work (e.g., through a hydraulic system). Alternatively, the piston 26 can charge the pressure inside a large pressure tank 18, which in turn can run a traditional turbine to drive electric generators or mechanical systems.

For the open and closed cycles mentioned above, there can be a multiplicity of the system in parallel, series, or a combination of parallel and series operating in unison to achieve maximum work so that the net effect appears to be continuous. An analogy is the six- or eight-cylinder internal combustion engine with a flywheel that balance vibrations and power output from intermittent combustion to produce smooth continuous power output.

Figure 4:
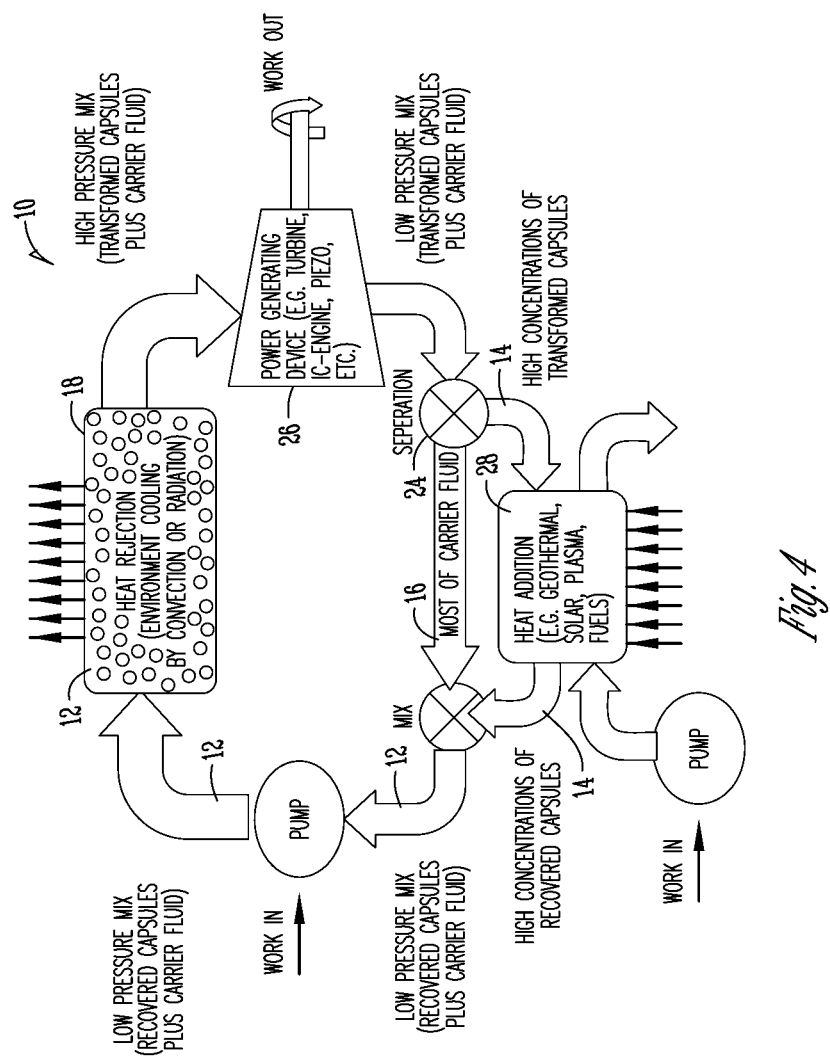
FIG. 4 is an example of one embodiment of an open cycle system.
Figure 5:
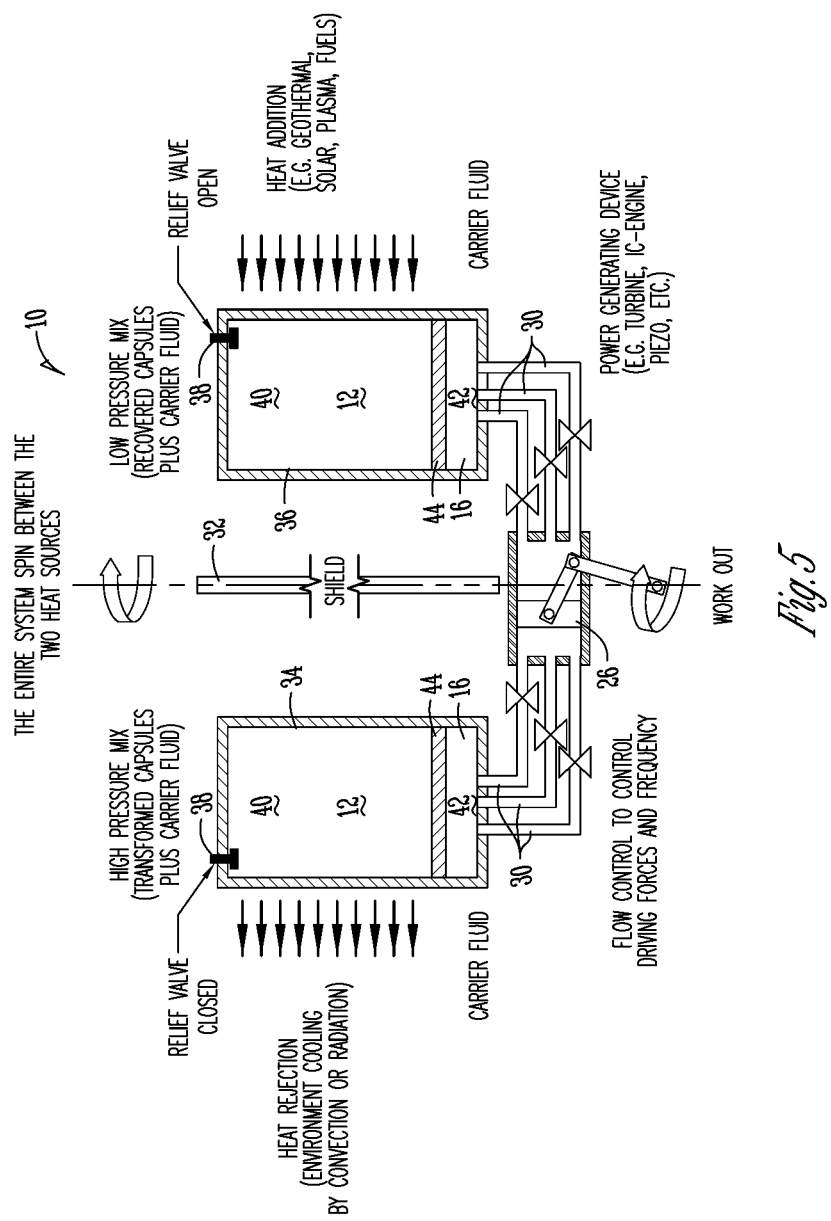
FIG. 5 is an example of one embodiment of a closed cycle system.

FIGS. 4 and 5 show two example devices operating in open and closed cycles. FIG. 4 shows an open-cycle system operating between two temperature sources, hot and cold. The mix of the carrier liquid 16 and PCM 14 in liquid state enters the heat rejection system 10, operating at the cold temperature (could be ambient). In the heat rejection system 10, the PCM 14 loses energy via cooling, gets transformed (i.e., freezes), and builds up pressure. The high-pressure mix is passed to an energy conversion device 26 (e.g. turbine, reciprocating pistons, piezo drive, etc.) to do work. Once energy is extracted, the mix—now at low pressure—goes to a separator 24, where the PCM 14 is separated from the carrier liquid 16. The PCM 14 is then sent to a heater, where it is melted by using low-grade energy sources 28 such as solar, geothermal, and/or waste heat. The cycle then repeats.

In FIG. 5, another device is shown with a closed reciprocating cycle with momentum attenuation in capillary tubes 30 for controlling the desired Torque-Speed Characteristics. FIG. 5 shows the principle-of-operation of the system 10 between two temperature sources, hot and cold, which are separated by a heat shield 32. The entire system 10 will reciprocate (or rotate) for sequential exposure at the hot and cold temperatures. The system is composed of two cylinders 34, 36, equipped with pressure release valves 38. The two cylinders 34, 36 are connected via the system of multi-valves for controlling the Torque-Speed Characteristics. Each cylinder 34, 36 has two chambers 40, 42, connected with a floating piston 44. In the upper chamber 40, a mix 12 of the PCM 14 and a carrier liquid 16 is contained. The lower chamber 42 contains carrier liquid 16 only, which will drive the work output device. When the left cylinder 34 is exposed to the cold side, the relief valve 38 is locked. The system will reject heat, forcing the PCM to be transformed and build up pressure. The pressurized mix will push the piston 44 in the left chamber 34, driving the carrier liquid 16 to drive the work output device 26 (turbine, reciprocating piston, piezo drive, etc.) through the regulated multi-valve channels 30. Three lines are depicted in the drawing; however, the exact number and dimensions would be selected based on the required torque-speed characteristics and other considerations. The swept volume of the carrier liquid 16 will be fed to the right cylinder 36 while its relief valve 38 is open. Upon exhaustion of the momentum transfer, the system 10 is rotated to bring the transformed cylinder to the hot side. The relief valve 38 is now opened and the low pressure transformed media is set to recover. The process is repeated at the cold side again. Different realizations can also be implemented using the generic closed cycle such as the one depicted in FIG. 3.

In summary, it is emphasized that the proposed energy harvesting and power-generation technique can operate over a very small temperature difference across which a medium changes phase from liquid to solid or a solid-solid phase transformation. Thus, the heating and the cooling required can be acquired from low-grade energy sources (e.g., heating from waste heat, solar, and geothermal and cooling from the environment). Also, any material that expands in volume upon phase change may be used as the phase-change media. As mentioned, water is one such material, and it is in vast quantity. Finally, but not least, note that the proposed invention produces no pollution, uses only renewable energy sources, is safe to operate, can have extremely long service life because operating environment is non-extreme, and can be produced at low cost.

Application Areas

The proposed invention has a wide range of applications. These may be classified as follows: (1) electrical and mechanical power generation for land, water, air, and space systems; (2) portable electrical and mechanical power systems; (3) mechanical power to provide for propulsion; (4) mechanical power to drive micro and nano electromechanical systems, and (5) mechanical power to drive hydraulic systems. For the particular embodiment discussed here, it is assumed that water is used as the phase-change media (although the phase-change media may be varied to match operating conditions).

Electrical and Mechanical Power Generation for Land, Water, Air, and Space Systems: The electrical-energy power needed by households can be derived from the Power Grid or from power-generation devices located in homes. The proposed invention can provide the electrical energy needs in households if the ambient temperature is low enough (e.g., below freezing if the PCM is water). The high-temperature source can be geothermal, where ground water at 20° C. is pumped up by digging a well. Alternatively, the high-temperature source may be the waste heat from other power sources such as solar heating and other means such as combustion of natural gas or cellulose fibers. To generate electricity for the Power Grid, a power-generation plant based on this invention can be located where the ambient temperature is always well below the freezing point so that the environment can always serve as the low temperature source. The high-temperature source could be geothermal or the waste heat from other types of engineering systems. Alternatively, this invention can be used to augment existing electrical power-generation plants by utilizing the waste heat (e.g., recovering the heat lost when steam condenses to water in steam power plants) and the environment. The aforementioned are for land-based systems. For systems that operate in water such as ships, the river, sea, and ocean waters can serve as the high-temperature source, while the air can serve as the low-temperature source. For systems that operate in air such as a commercial aircraft operating at 35,000 feet above sea level, the high-temperature source could be extracted from the engine or a combustor operating at low pressures, and the low-temperature source would be the cold air outside of the aircraft. For systems such as the spacecraft, the high-temperature source would be the part of the spacecraft that faces the sun, and low-temperature source would be the part of the spacecraft that faces empty space (this could replace photovoltaic power sources which are bulky and complicated). These systems can also operate in extra-terrestrial environments such as the moon, where there are vast temperatures differences. For all of the above, electricity is generated if the high-pressure induced by the freezing or solid-solid phase changes is used to run an electric generator. But, if mechanical power is needed, then the high-pressure media can be used to generate the required mechanical power directly.

Portable Electrical and Mechanical Power Systems: The aforementioned systems can be made portable if the low-temperature source is the environment and the ambient temperature is low enough. The high-temperature source could be body temperature, waste heat from cooking, solar heating, heat generated by friction induced by body motion, and heat from a low-heat burner (e.g., cigarette-lighter class of burners). On portable systems that use body heat or body motion as the high-temperature source, it could be wearable. For applications in wearable fabrics, it may be envisioned that the device shown in FIG. 4 be miniaturized and encapsulated within two layers of fabrics in a garment such as a jogging suit. The cold side will face the colder (sub-freezing) environment, and the hot side will face the inner layer of the garment next to the body. As the pressure is generated, the whole device will rotate within the two layers of the garment and repeat the cycle. The energy produced (through for example a piezo electric stack) may be stored in a battery pack. Such devices may be useful for athletes involved in winter sports (e.g., cross country skiing, speed skating, etc., where the body heat generated during the workout or a competitive event may be quite high. Excessive generation of heat and its associated sweating can reduce the efficiency of the athlete. The present invention can provide a garment such as ski-suit that will regulate this tendency to overheat, and at the same time, store that energy for useful work at a later time. Thus, the energy required by space suits or military personal in battle field are other possible applications.

Mechanical Power for Propulsion: As mentioned, the high-pressure working fluid can drive an electric generator to produce electricity or drive a mechanical system to produce useful work directly including propulsion. For land based and marine transportations, two embodiments are envisioned. In one, the high temperature source is the waste heat from the exhaust gas. In the other, high-temperature waste heat recovery by utilizing higher temperature materials as the carrier fluids (e.g., tin-based solder alloys, waxes, etc.). If augmented to existing engines, then this invention could serve as a hybrid in which when the weather is cold enough, the propulsion will be generated by the proposed invention, and the traditional engine can be turned off. The high-temperature source needed to melt the frozen liquid can be partially harvested from the heat generated by friction. The remainder could be from a low-pressure burner.

Mechanical Power to Drive Hydraulic Systems: It is well known that hydraulic system can carry heavy loads. Currently, electricity is used to drive these systems either via a pumping system or by direct actuators. The proposed invention suggests using the concept of PCM/carrier fluid mix to drive such systems.

In summary, there is a very wide range of applications for the proposed invention. The proposed invention could stand by itself or serve as a hybrid to enhance the efficiency of existing power-generation systems. Even in environments that may not be cold enough, one could carry ice. Thus, one may envision a vehicle that runs 100 miles per cubic foot of ice or liquid nitrogen stored in insulated containers, and filling stations that just provides ice and/or liquid nitrogen. In this case, the environment serves as the high-temperature source.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. An apparatus for harvesting energy and generating power, the apparatus comprising:
   a working media comprising a phase-change media contained within expandable capsules and a carrier media that does not change phase in an operating temperature range;
   wherein the phase-change media expands upon cooling to create pressure in the working media;
   a heat exchanger;
   a separator;
   a mixer;
   a recirculating pump;
   a pressurizer; and
   a power harvesting device.

2. The apparatus of claim 1 wherein the phase-change media contained within expandable capsules are dispersed throughout the carrier media.

3. The apparatus of claim 1 wherein the phase-change media undergoes phase change non-uniformly, 4. The apparatus of claim 1 wherein energy is harvested from the pressure rise in the working media induced by transformation of the phase-change media mixed with the carrier media.

* * * * *